US009926849B2

(12) United States Patent
Frost et al.

(10) Patent No.: US 9,926,849 B2
(45) Date of Patent: Mar. 27, 2018

(54) TRANSVERSE MOUNTED ACCESSORY GEARBOX

(71) Applicant: HONEYWELL INTERNATIONAL INC., Morristown, NJ (US)

(72) Inventors: Cristopher Frost, Scottsdale, AZ (US); Mariee Hayden, Wisconsin Rapids, WI (US); Michael Stephen Crestin, Chandler, AZ (US); James Laffan, Phoenix, AZ (US); Mingfong Hwang, Phoenix, AZ (US); Doug Hollingshead, Phoenix, AZ (US); Marc Schmittenberg, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 296 days.

(21) Appl. No.: 14/836,484

(22) Filed: Aug. 26, 2015

(65) Prior Publication Data

US 2016/0040601 A1 Feb. 11, 2016

Related U.S. Application Data

(63) Continuation-in-part of application No. 13/160,380, filed on Jun. 14, 2011, now Pat. No. 9,145,834.

(51) Int. Cl.
*F02C 7/32* (2006.01)
*F02C 7/36* (2006.01)

(52) U.S. Cl.
CPC ............... *F02C 7/32* (2013.01); *F02C 7/36* (2013.01); *F05D 2250/313* (2013.01); *F05D 2260/53* (2013.01); *Y02T 50/671* (2013.01)

(58) Field of Classification Search
CPC ........ F02C 7/32; F02C 7/36; F05D 2250/313; F05D 2260/53; Y02T 50/671; F01D 15/12; F16H 1/222
See application file for complete search history.

(56) References Cited

U.S. PATENT DOCUMENTS 2,608,056 A    8/1952   Lloyd et al.
2,638,744 A *   5/1953   Price ................. F02C 7/32
                                                                  415/194
(Continued)

FOREIGN PATENT DOCUMENTS

EP      2535544 A2   12/2012
GB      1103417 A     2/1968
(Continued)

OTHER PUBLICATIONS

USPTO Office Action for U.S. Appl. No. 13/160,380; dated Aug. 14, 2014.
(Continued)

*Primary Examiner* — Woody Lee, Jr.
*Assistant Examiner* — Adam W Brown
(74) *Attorney, Agent, or Firm* — Lorenz & Kopf, LLP

(57) ABSTRACT

An accessory gear box for a gas turbine engine having a drive shaft with a rotational axis and a tower shaft coupled to the drive shaft is provided. The accessory gear box includes a first plurality of gears arranged, which extend along a first axis substantially parallel to the rotational axis of the drive shaft. The accessory gear box includes a second plurality of gears, which extend along a second axis. The accessory gear box includes a first shaft, with one of the first plurality of gears coupled to the first shaft, and one of the second plurality of gears coupled to a second shaft. The one of the second plurality of gears coupled to the first shaft includes a first engagement surface and a second engagement surface, and the second engagement surface is coupled to another one of the second plurality of gears to drive the second shaft.

20 Claims, 11 Drawing Sheets

(56) References Cited

U.S. PATENT DOCUMENTS

| | | | |
|---|---|---|---|
| 2,727,602 A * | 12/1955 | Saives | B61C 9/30 180/301 |
| 2,803,943 A * | 8/1957 | Rainbow | F02C 7/32 60/262 |
| 3,455,182 A | 7/1969 | Kelley | |
| 3,714,779 A | 2/1973 | Stein et al. | |
| 4,068,470 A | 1/1978 | Sargisson et al. | |
| 5,143,329 A | 9/1992 | Coffinberry | |
| 5,687,561 A | 11/1997 | Newton | |
| 6,883,750 B2 | 4/2005 | Gmirya | |
| 7,063,734 B2 | 6/2006 | Latulipe | |
| 7,484,354 B2 | 2/2009 | Stretton | |
| 7,500,365 B2 * | 3/2009 | Suciu | F02C 7/32 60/802 |
| 7,975,465 B2 * | 7/2011 | Morris | F02C 6/08 244/60 |
| 8,192,143 B2 * | 6/2012 | Suciu | F01D 25/18 415/108 |
| 8,490,410 B2 * | 7/2013 | Suciu | F02C 7/32 60/788 |
| 8,764,383 B2 * | 7/2014 | Deperrois | F02C 7/32 415/122.1 |
| 8,905,191 B2 * | 12/2014 | Brandt | F01D 25/18 184/6.11 |
| 2008/0073152 A1 | 3/2008 | Eleftheriou et al. | |
| 2009/0123274 A1 | 5/2009 | Chaudhry | |
| 2009/0139243 A1 | 6/2009 | Winter | |
| 2009/0212156 A1 | 8/2009 | Blumer | |
| 2009/0223052 A1 | 9/2009 | Chaudhry et al. | |
| 2009/0232640 A1 | 9/2009 | Deperrois et al. | |
| 2010/0242496 A1 | 9/2010 | Cass et al. | |

FOREIGN PATENT DOCUMENTS

| | | |
|---|---|---|
| WO | 2014/195632 A1 | 12/2014 |
| WO | 2015/124857 A1 | 8/2015 |

OTHER PUBLICATIONS

USPTO Office Action for U.S. Appl. No. 13/160,380; dated Feb. 13, 2015.

USPTO Notice of Allowance and Fee(s) Due for U.S. Appl. No. 13/160,380; dated May 27, 2015.

Extended EP Search Report for Application No. 16174673.0-1607 dated Jan. 19, 2017.

* cited by examiner

TRANSVERSE AGB

CONVENTIONAL AGB

TRANSVERSE MOUNTED ACCESSORY GEARBOX

CROSS-REFERENCE TO RELATED APPLICATION

This application is a continuation-in-part of U.S. patent application Ser. No. 13/160,380 filed on Jun. 14, 2011. The relevant disclosure of the above application is incorporated herein by reference.

STATEMENT REGARDING FEDERALLY SPONSORED RESEARCH OR DEVELOPMENT

This invention was made with Government support under contract number W911W60820001 awarded by the Unites States Army under the Advanced Affordable Turbine Engine program. The Government has certain rights in this invention.

TECHNICAL FIELD

The present disclosure generally relates to gas turbine engines, and more particularly relates to an arrangement and connection of an accessory gear box to the power shaft.

BACKGROUND

An accessory gear box (AGB) is mounted on a gas turbine engine and drives various support components required to sustain engine operation. The support components include but are not limited to a fuel pump, an oil pump, an air driven starter, and air/oil separator, and an electrical generator. These components, the gearbox and the engine itself must fit within a confined space called an engine nacelle.

Referring to FIG. 1, a typical gas turbine engine 100 comprises of a compressor section 5, a combustion section 10 and a turbine section 15 arranged sequentially in that order. All of these sections are roughly cylindrical and oriented coaxially. A set of compressor blades in the compressor section 5 and a set of turbine blades in the turbine section 15 are driven in tandem by the engine drive shaft 30 extending coaxially completely through the gas turbine engine 100 from the compressor section 5 to the turbine section 15.

A tower shaft that is driven by bevel gears off of the drive shaft is typically used to transfer power from the drive shaft 30 to the auxiliary gearbox that is located outside of the exterior casing of the gas turbine engine and inside the nacelle or engine bay. A conventional gear box has at least one gear axis 41 running parallel with the engine drive shaft 30. The AGB 40 drives the support components 42 via a series of interlocking drive gears (See, FIG. 1B) that are oriented orthogonally to the gear axis 41. Each of the support components 42 are arranged arcuately around the engine casing 50 and located radially away from the drive shaft 30 and are situated outboard of the widest cylindrical section of the gas turbine engine (e.g., the inlet frame 45) in order to fit within the nacelle or the engine bay and also not interfere with the engine casing 50. This positioning is necessary because the irregular radius of the gas turbine engine casing 50 physically precludes the combined auxiliary gear box 40 and its support components 42 from being installed any closer to the drive shaft of the gas turbine engine.

The relatively long tower shaft 35 driving the AGB 40 and the disbursed, arcuate arrangement of the support components 42 (see, FIG. 1B) produces a significant churning of lubrication oil within the AGB 40 and results in less than efficient lubrication and lubrication oil scavenging. The arrangement also requires an unnecessarily large amount of space within the nacelle or engine bay (See, FIG. 3).

Accordingly, it is desirable to provide an alternative gearbox architecture that allows the gearbox to be compactly contoured and positioned closer to the exterior engine casing to reduce weight and improve oil scavenging.

In addition, it is desirable to provide a gearbox architecture providing superior oil scavenging from the gearbox housing. Furthermore, other desirable features and characteristics of the present invention will become apparent from the subsequent detailed description of the invention and the appended claims, taken in conjunction with the accompanying drawings and this background of the invention.

BRIEF SUMMARY

A gas turbine engine is provided. The gas turbine engine comprises a drive shaft, a compressor, a combustor, and an exhaust turbine, where the exhaust turbine and the compressor are coaxially and serially connected by the drive shaft. The gas turbine further comprises an engine casing of varying diameters that circumferentially envelopes the compressor, the combustor and the exhaust turbine. The gas turbine engine and engine casing has a waist located between the compressor and the combustor. The gas turbine engine also comprises an accessory gear box ("AGB") attached to the engine casing at or near the waist. The AGB comprises a gear rotating on an axis extending in a transverse direction relative to that of the drive shaft.

An AGB is provided. The AGB comprises a housing defining an opening and two or more gears mounted within the housing. Each of the two or more gears rotates about its own axis where each axis is transverse to the drive shaft of the gas turbine engine.

A gas turbine engine is provided. The gas turbine engine comprises a drive shaft; and an accessory gear box (AGB). The AGB further comprises a housing having an opening and two or more gears mounted within the housing, each of the two or more gears rotating about its own axis, each axis being transverse to an axis of the drive shaft of the gas turbine engine.

According to various embodiments, an accessory gear box for a gas turbine engine having a drive shaft with a rotational axis and a tower shaft coupled to the drive shaft is provided. The accessory gear box includes a first plurality of gears arranged within the accessory gear box. The first plurality of gears extend along a first axis substantially parallel to the rotational axis of the drive shaft. The accessory gear box includes a second plurality of gears arranged within the accessory gear box. The second plurality of gears extend along a second axis, and the second axis is offset from and substantially parallel to the first axis. The accessory gear box includes a first shaft, with one of the first plurality of gears coupled to the first shaft, and one of the second plurality of gears coupled to a second shaft. The one of the second plurality of gears coupled to the first shaft includes a first engagement surface and a second engagement surface, the first engagement surface to engage the tower shaft and the second engagement surface is coupled to another one of the second plurality of gears to drive the second shaft.

Also provided is a gas turbine engine, according to various embodiments. The gas turbine engine includes a drive shaft having a rotational axis and a tower shaft. The tower shaft has a first end coupled to the drive shaft, and a second end including a bevel gear. The tower shaft having a longitudinal axis transverse to the rotational axis of the drive shaft. The gas turbine engine includes an accessory gear box. The accessory gear box includes a first plurality of gears arranged within the accessory gear box. The first plurality of gears extend along a first axis substantially parallel to the rotational axis of the drive shaft and transverse to the longitudinal axis of the tower shaft. The accessory gear box includes a second plurality of gears arranged within the accessory gear box. The second plurality of gears extend along a second axis, and the second axis is offset from and substantially parallel to the first axis and the rotational axis of the drive shaft. The accessory gear box includes a first shaft, with one of the first plurality of gears coupled to the first shaft, and one of the second plurality of gears coupled to a second shaft. The one of the second plurality of gears coupled to the first shaft includes a first engagement surface and a second engagement surface, and the first engagement surface is coupled to the bevel gear of the tower shaft.

Further provided according to various embodiments is a gas turbine engine. The gas turbine engine includes a drive shaft having a rotational axis and a tower shaft. The tower shaft has a first end coupled to the drive shaft, and a second end including a bevel gear. The tower shaft has a longitudinal axis transverse to the rotational axis of the drive shaft. The gas turbine engine includes an accessory gear box. The accessory gear box includes a first plurality of gears arranged within the accessory gear box. The first plurality of gears each have a rotational axis, and the rotational axis of each of the first plurality of gears substantially perpendicular to the rotational axis of the drive shaft and the longitudinal axis of the tower shaft. The accessory gear box includes a second plurality of gears arranged within the accessory gear box. The second plurality of gears each having a rotational axis, and the rotational axis of each of the second plurality of gears substantially perpendicular to the rotational axis of the drive shaft and the longitudinal axis of the tower shaft. The rotational axis of each of the second plurality of gears is substantially parallel to the rotational axis of each of the first plurality of gears. The accessory gear box includes a first shaft, with one of the first plurality of gears coupled to the first shaft, and one of the second plurality of gears coupled to a second shaft. The one of the second plurality of gears coupled to the first shaft includes a first engagement surface and a second engagement surface. The first engagement surface is coupled to the bevel gear of the tower shaft and the second engagement surface is coupled to another one of the second plurality of gears to drive the second shaft.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
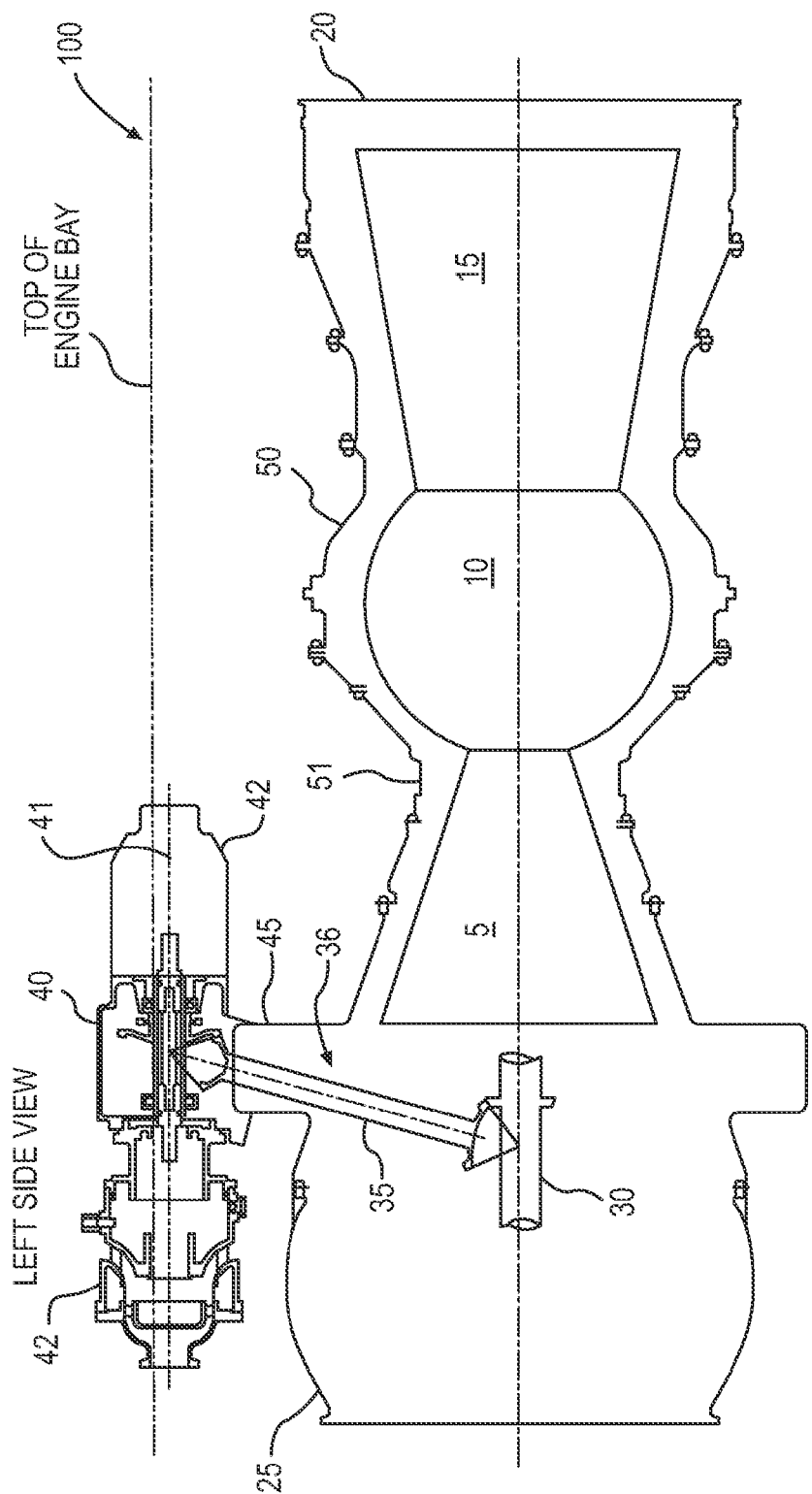
FIG. 1 is a left side cutaway view of an exemplary gas turbine engine with a conventional longitudinal accessory Gear Box (AGB)

FIG. 1 is a simplified cross sectional side view of a gas turbine engine 100 and a conventional AGB 40 mounted thereon at the periphery of the inlet frame 45. A typical gas turbine engine includes an air intake bellmouth 25, a compressor 5, a combustion section 10, an exhaust turbine 15, an exhaust plenum 20 and a conventional AGB 40. The compressor 5, the exhaust turbine 15 and the AGB 40 are all coaxially driven by the drive shaft 30, which is shown only in part in the interest of brevity and clarity.

With the exception of the AGB 40, the entire engine is enclosed in an engine casing 50. The engine casing 50 and the AGB 40 must all fit with the confines of an aerodynamic nacelle or within an engine bay. A nacelle is a cover housing that is separate from the aircraft fuselage that holds engines, fuel, or equipment.

Figure 1A:
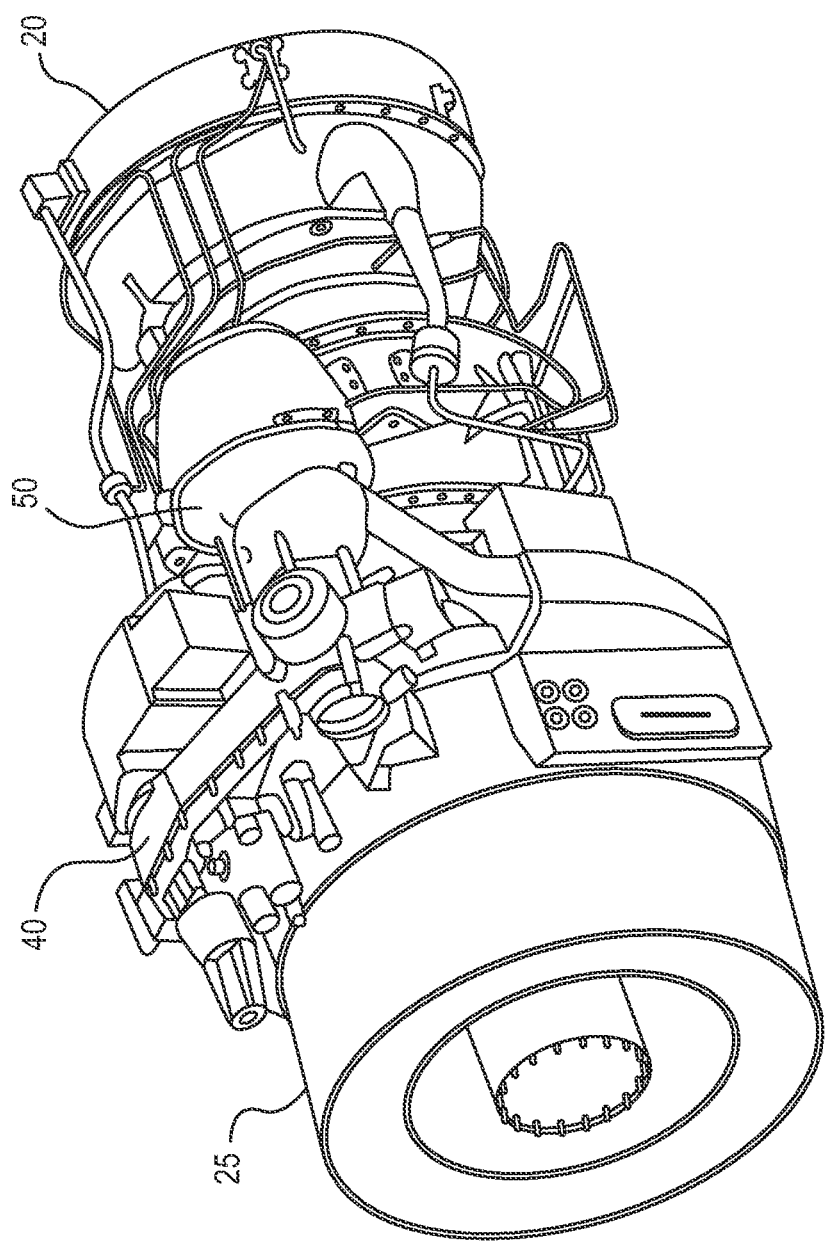
FIG. 1A is a perspective view of the gas turbine engine with a conventional AGB wrapped around the top of the engine casing.

Conventionally, accessories 42 that are driven by the accessory gearbox are arranged in a direction that is coaxial with the drive shaft 30 and are dispersed arcuately along an angular segment of the inlet frame 45 section of the engine casing 50 (See, FIG. 1A). This arrangement permits the accessories 42 to fit between a wall of an engine bay and the engine casing 50. Thus, in conventional architectures the AGB 40 must also be arcuate.

Figure 2:
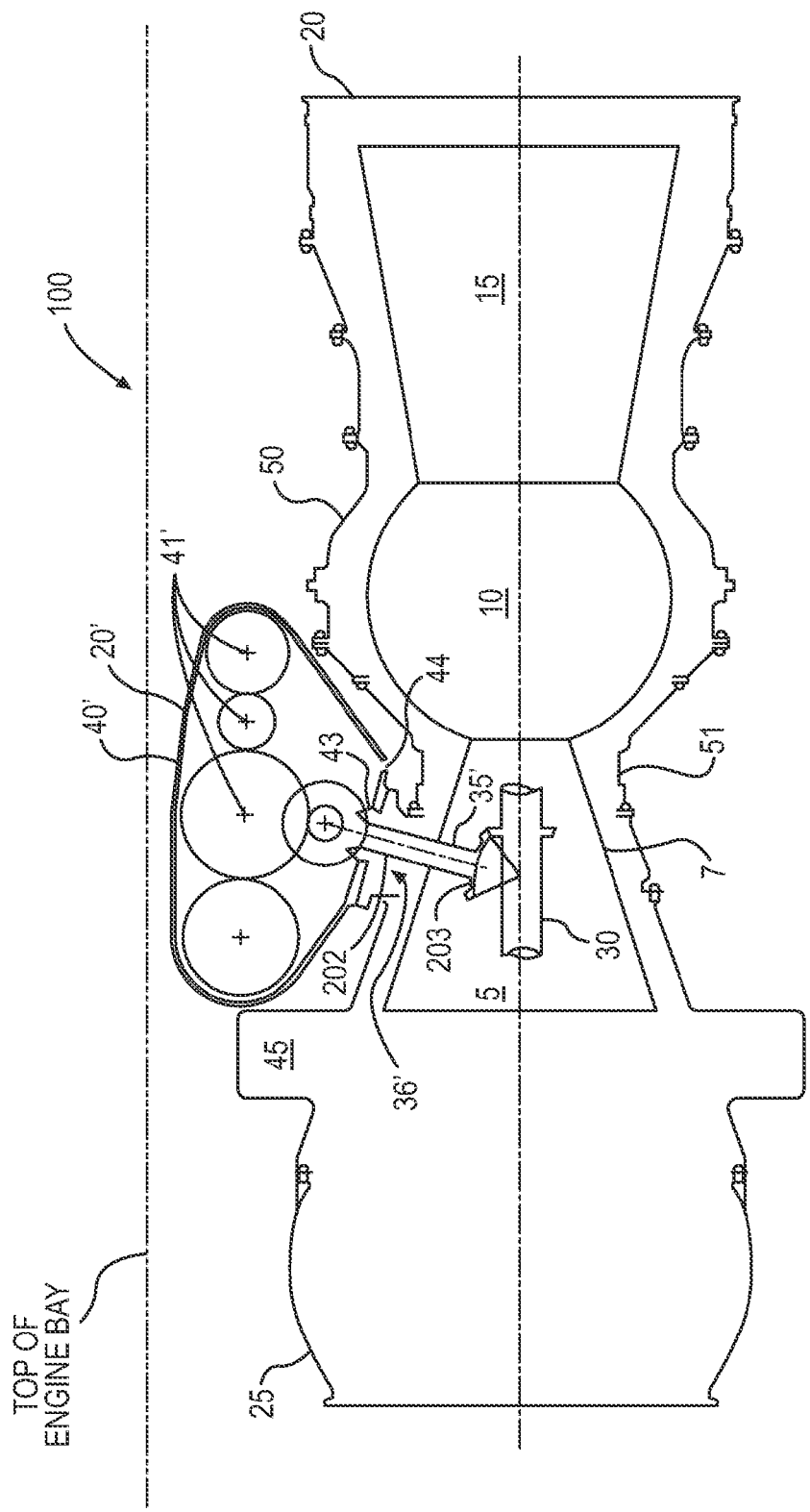
FIG. 2 is a left side cutaway view of a gas turbine engine with an exemplary transverse AGB installed at the engine casing waist according to embodiments.
Figure 2A:
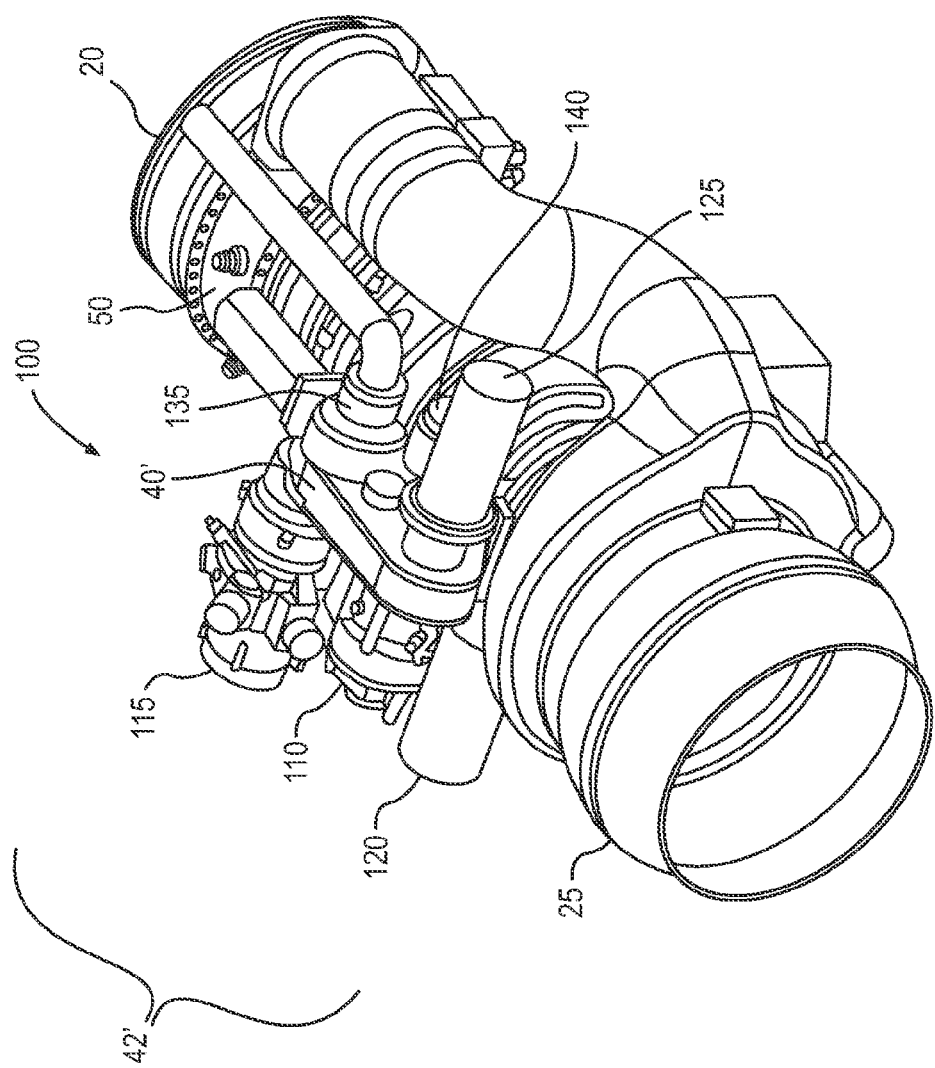
FIG. 2A is a perspective view of the gas turbine engine with an exemplary transverse AGB installed at the engine casing waist according to embodiments.
Figures 1B, 2B:
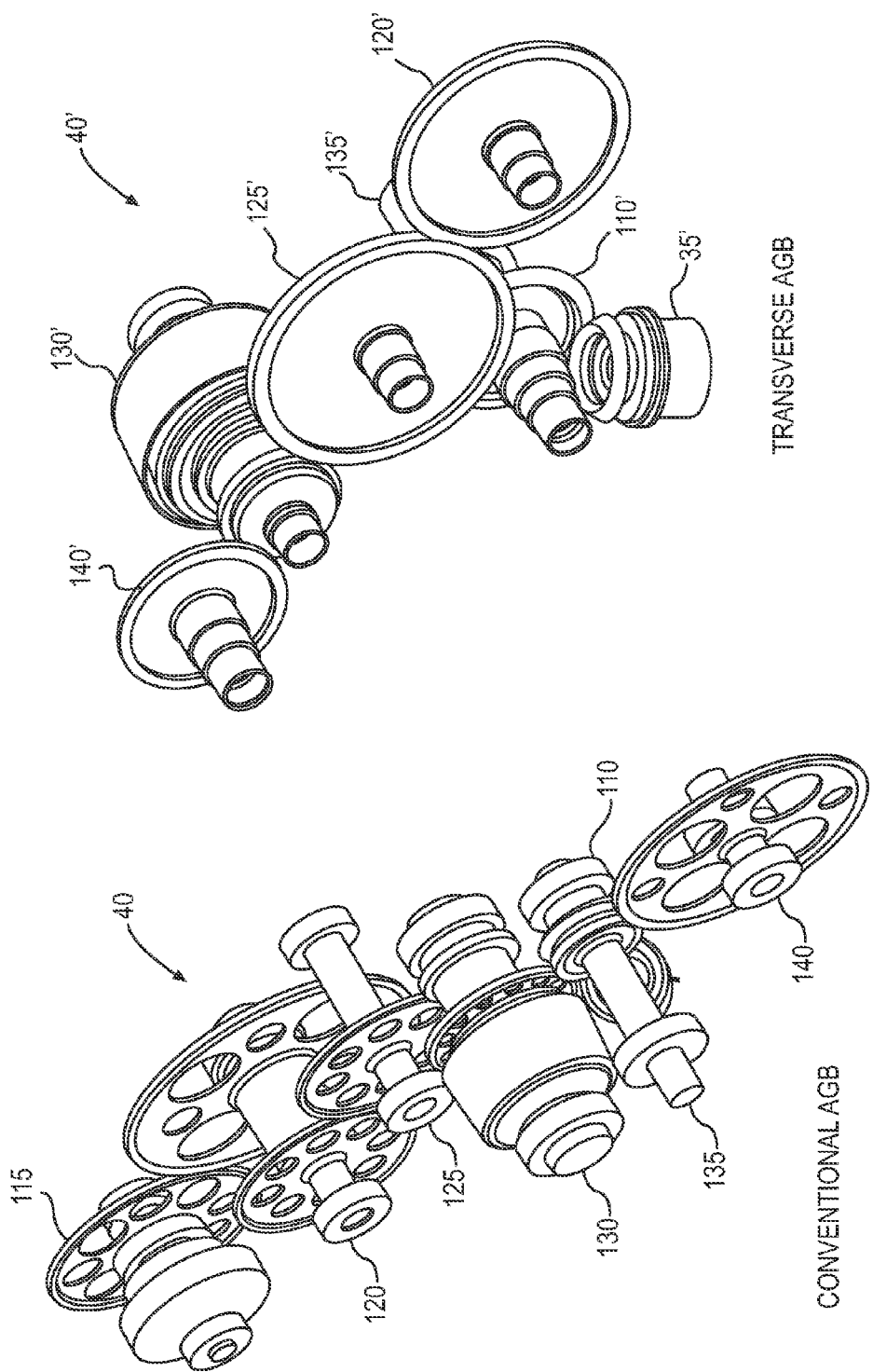
FIG. 1B is a disembodied view of a gearing arrangement of a conventional longitudinal AGB.
FIG. 2B is a disembodied view of an exemplary view of a gearing arrangement of an exemplary transverse AGB according to embodiments.

FIG. 1B is a simplified typical gearing architecture of a conventional AGB 40. The AGB 40 may include, inter alia, gearing for a starter 110, an inlet particle accelerator fan 115, a compound idler gear 120, lubrication oil pump 125, an air oil separator 130, a generator shaft 135 and a fuel pump 140. The AGB 40 is driven by the drive shaft 30 via a relatively long tower shaft 35 (See FIG. 1) and its associated bevel gears.

Referring again to FIG. 1, the accessories 42 driven by the AGB 40 must be positioned around the circumference of the engine casing 50 to locations on the inlet frame 45 that are radially the closest to the drive shaft of the gas turbine engine 100 in order to maximize the space available between the nacelle and the engine casing 50. As can be seen in FIG. 1, it is shown that the AGB 40 must be simultaneously positioned distantly from the drive shaft 30 to allow the accessories 42 that are mounted on the forward or aft side of the AGB 40 to clear the inlet frame 45 portion of the engine casing 50. Thus, the tower shaft 35 must be long enough to extend from the drive shaft 30 to the gearing (See, FIG. 1A) of the AGB 40. Because the accessories 42 are arrayed around the circumference of the engine casing 50, the AGB 40 is necessarily laid out in the narrow arcuate configuration that wraps around the engine casing at a distance required to clear the radial profile of the engine casing 50. The resulting arcuate arrangement of the AGB 40 makes oil management more difficult because the oil is susceptible to gear churn as it travels along inside the AGB 40 to the various scavenger ports (not shown) towards either distal end of the AGB 40. Thus, the arcuate arrangement requires more oil scavenging points to collect the lubricating oil and return it to the lubricating oil pump.

FIG. 2 is a simplified cross sectional side view of the gas turbine engine 100 and an exemplary transverse AGB 40' mounted thereon according to embodiments. The gas turbine engine 100 includes the air intake bellmouth 25, the compressor 5, the combustion section 10, the exhaust turbine 15, the exhaust plenum 20 and a transverse AGB 40'. The compressor 5, the combustion section 10, the exhaust turbine 15 and the transverse AGB 40' are all driven by the drive shaft 30, which is shown in part in the interest of brevity and clarity.

A salient feature of the embodiments of FIG. 2 is the rotational axes 41' of the transverse AGB 40' are perpendicular to the drive shaft 30. Thus, the rotational axes 41' of all of the accessories (not shown) driven by the transverse AGB 40' are also perpendicular to the drive shaft 30. Although the rotational axes 41' of the transverse AGB 40' are disclosed as being perpendicular, it will be appreciated that the rotational axes 41' need not be precisely perpendicular. The rotational axes 41' of the transverse AGB 40' may deviate from true perpendicularity as may be required by the overarching design of the gas turbine engine 100.

Another salient feature of the embodiments of FIG. 2 is that the mounting for the transverse AGB 40' may be moved aft from the inlet frame 45 towards the combustion section 10 to take advantage of the narrower radius of the engine casing in the vicinity of a narrowing (commonly referred to as the waist) 51 of the engine casing 50 that is located in the vicinity of the high pressure stages 7 of the compressor 5. Thus, the accessories (not shown) may be aggregated together more compactly in the transverse AGB 40' to fit into the space available at the waist 51. In the case of the conventional AGB 40 (See, FIG. 1), the length of the various accessories attached thereto prevented any space savings because the physical size of the accessories clashed either with the inlet frame 45 or the engine casing 50 in the vicinity of the combustion section 10. An additional advantage that may be realized from the use of a transverse AGB 40' is that the tower shaft 35' may be reduced in length thereby eliminating weight and reducing torsion strain that would otherwise occur in a longer tower shaft (such as tower shaft 35 of FIG. 1). The tower shaft 35' has a first end 202 and a second end 203. The first end 202 is connected to the gearing 42' of the transverse AGB 40' via a translational or bevel gear 43 and the second end 203 is connected to the drive shaft 30 via a bevel gear via the opening 36' in the housing 20'.

Further, oil scavenging is improved. By reducing the width and increasing the depth of the transverse AGB 40', most of the AGB lubrication oil returns to the engine casing via the tower shaft opening 36' in the transverse AGB 40'. Thus, fewer scavenging ports 44 are required in the AGB housing 20' to collect and return the AGB lubrication oil. Whatever number of scavenging ports 44 that may be required can be located at the lowest points in the transverse AGB 40'. This may be desirable to scavenge oil when the gas turbine engine 100 is in a non-level flight attitude such that the tower shaft opening 36' is not the lowest point in the transverse AGB 40'. FIG. 2 illustrates one scavenging port 44 at a potential low point in the transverse AGB 40'. Such illustration is merely exemplary and should not be construed as limiting the number of scavenging ports disclosed herein to the single scavenging port 44.

FIG. 2A is an rendition of an exemplary installation on an HPW3000 gas turbine engine produced by from Advanced Turbine Engine Company (ATEC) with a exemplary transverse mounted AGB 40' according to embodiments. The gas turbine engine 100 includes the engine casing or housing 50, the air intake bellmouth 25, the compressor 5, the combustion section 10, the exhaust turbine 15, the exhaust plenum 20 (See, FIG. 2) and the transverse AGB 40'. The accessories 42' driven by the transverse AGB may include a starter 110, an inlet particle accelerator fan 115, one or more pumps (120', 125), an air oil separator 130, an air turbine starter 135 and a fuel control unit 140.

FIG. 2B is a disembodied view of an exemplary gearing arrangement for a transverse AGB 40'. The transverse AGB 40' is driven by the tower shaft 35' (via a bevel gear) and drives a number of gears (110'-140') for the accessories 42'. Exemplary accessories may include the air oil separator 130', fuel pump 120', idler gear 25', starter 110, generator shaft 135' and a lubrication oil pump 140' (See, also FIG. 2A).

Figure 3:
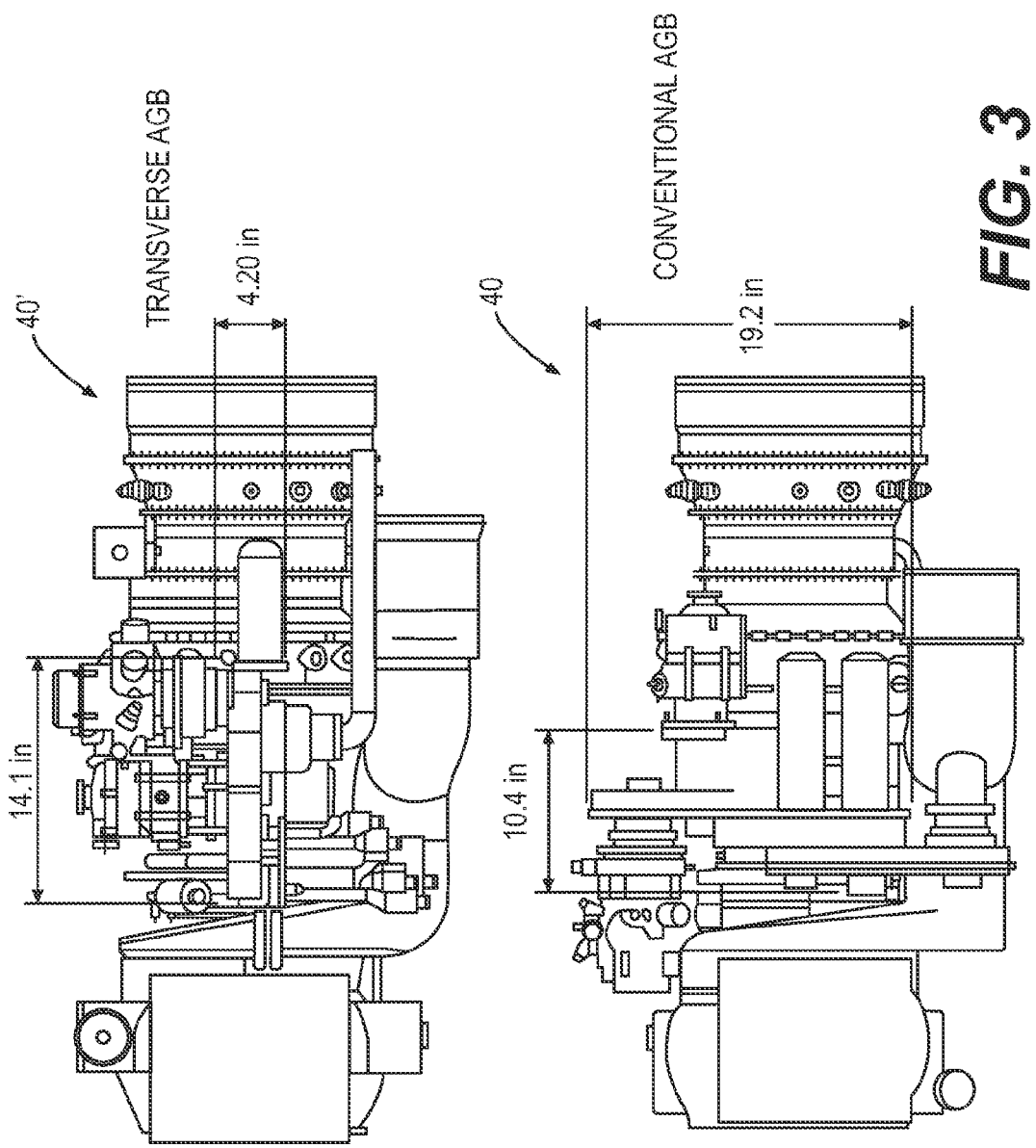
FIG. 3 is a comparison plan view of the dimensions of the gas turbine engine with the conventional AGB and an exemplary transverse AGB installed.

FIG. 3 is a side by side comparison of plan views of an exemplary gas turbine engine with a conventional AGB 40 and with a transverse AGB 40'. As may be seen, the width requirement of the transverse AGB 40' is 4.2 in. as compared to the conventional AGB 40 that has a width requirement of 19.2 in., which is a 79% reduction. The length requirement in this particular embodiment increases slightly from 10.4 inches to 14.1 inches. Because the AGB 40 represents the widest component of the engine; it is the controlling factor in regard to space constraints within the engine bay or nacelle.

Figure 4:
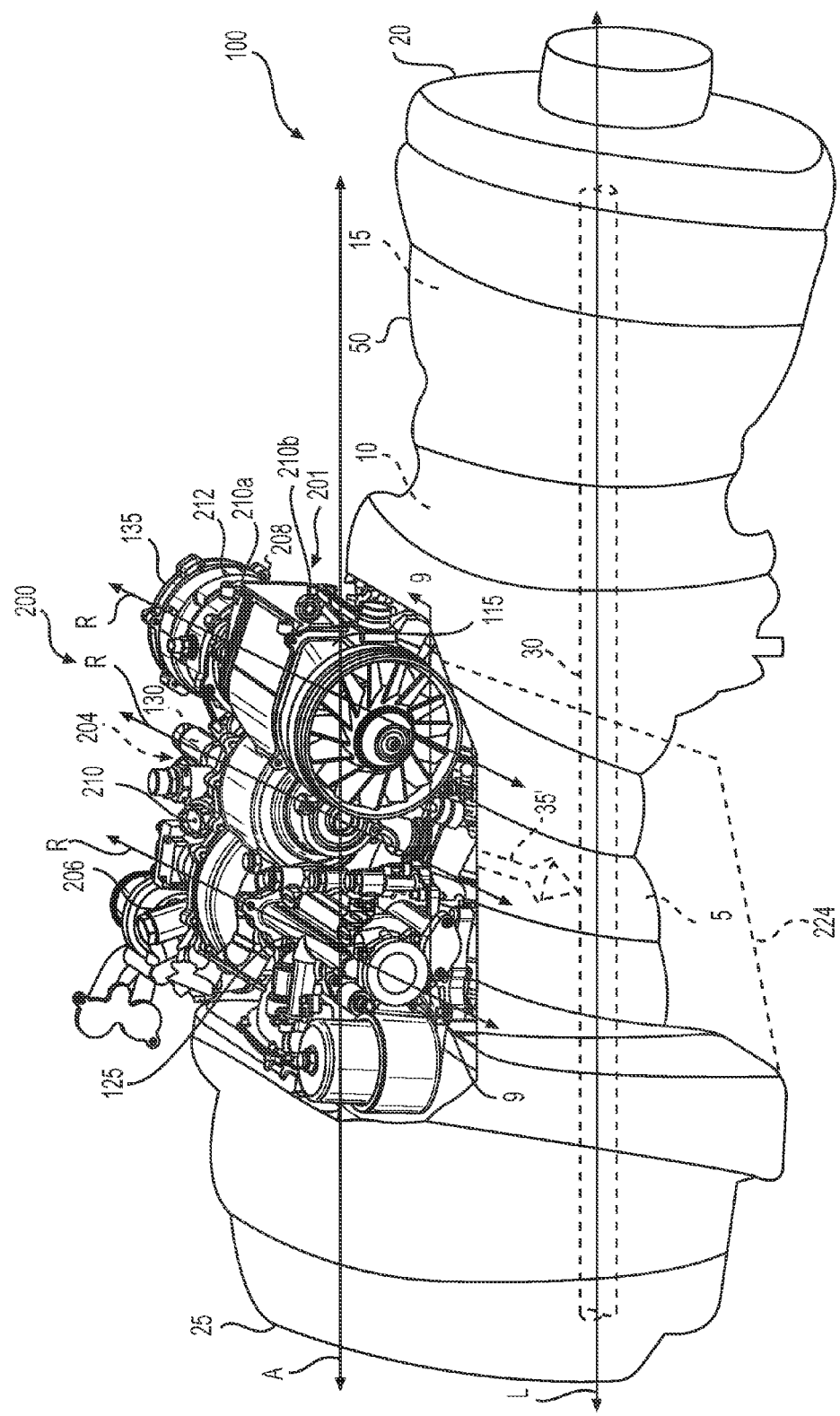
FIG. 4 is a perspective view of the gas turbine engine with an exemplary transverse AGB installed at the engine casing waist according to various embodiments.

With reference to FIG. 4, another exemplary transverse mounted AGB 200 is shown. As the transverse mounted AGB 200 may be mounted on any suitable gas turbine engine, such as the HPW3000 gas turbine engine produced by Advanced Turbine Engine Company (ATEC) discussed with regard to FIGS. 2-3, the same reference numerals used to denote the same or substantially similar components. In FIG. 4, the transverse mounted AGB 200 is coupled to the gas turbine engine 100. The gas turbine engine 100 includes the engine casing 50, the air intake bellmouth 25, the compressor 5, the combustion section 10, the exhaust turbine 15, the exhaust plenum 20 and the transverse AGB 200. As will be discussed herein, the transverse AGB 200 drives various accessories, such as the inlet particle accelerator fan 115, the oil pump 125, the air oil separator 130, the air turbine starter 135, a fuel metering unit 206 and a permanent magnet alternator 208. As the accessories driven by the transverse AGB 200 are generally known in the art, the accessories will not be discussed in detail herein.

The AGB 200 includes a housing 201 and a gear train assembly 204. The housing 201 is coupled to the gas turbine engine 100. As illustrated in FIG. 4, the housing 201 is coupled to the waist of the gas turbine engine 100. The housing 201 of the AGB 200 extends along an axis A. The axis A is substantially parallel to a longitudinal axis L of the gas turbine engine 100 and is substantially parallel to the rotational axis of the drive shaft 30 of the gas turbine engine 100. The housing 201 substantially encases or contains the gear train assembly 204 associated with the AGB 200. In one example, with reference to FIG. 5, the housing 201 comprises a gear case 210 and a cover 212. The cover 212 is coupled to a first side 210a of the gear case 210, which is opposite a second side 210b of the gear case 210. The cover 212 includes a plurality of bores 212a, which are sized and configured to receive a suitable fastener, such as a mechanical fastener 212b, to couple the cover 212 to the gear case 210. The cover 212 may also define one or more apertures 212c for receipt of portions of the gear train assembly 204.

Figure 6:
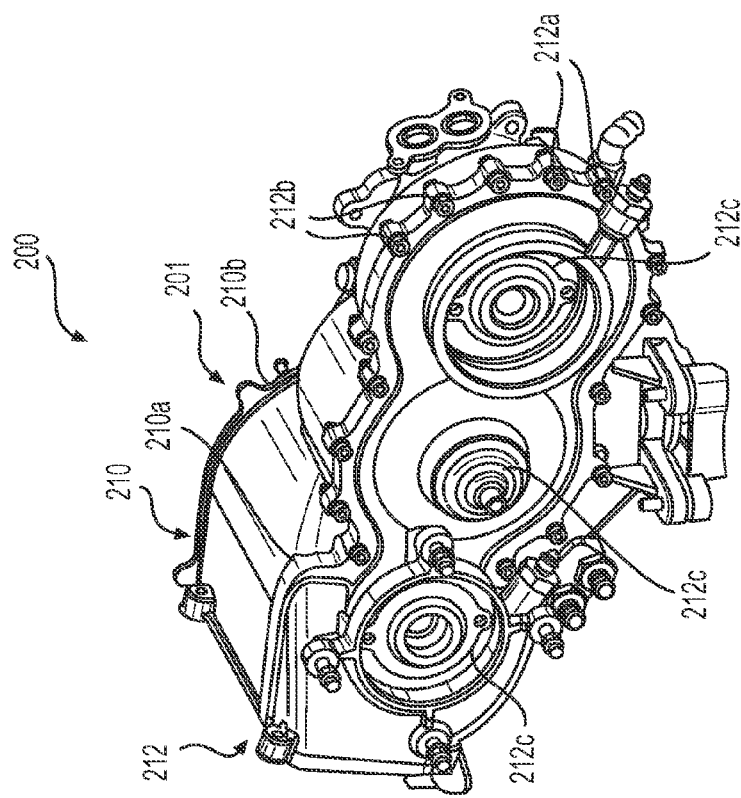
FIG. 6 is perspective view of the transverse AGB of FIG. 4 from a second side of the transverse AGB.

With reference to FIG. 6, the gear case 210 supports and encloses portions of the gear train assembly 204. Generally, the gear case 210 and the cover 212 support one or more bearings associated with the gear train assembly 204, and the bearings support one or more shafts associated with the gear train assembly 204, with the one or more shafts supporting a remainder of the gear train assembly 204. In this example, the gear case 210 includes a first portion 214, a second portion 216 and a third portion 218. The first portion 214 defines a cylindrical shaft 220. The cylindrical shaft 220 is defined within the first portion 214 so as to be substantially centered within a cavity 222 defined by the first portion 214. The cylindrical shaft 220 receives a portion of the gear train assembly 204. The permanent magnet alternator 208 is also received within the cylindrical shaft 220. The cavity 222 is sized and shaped to receive a portion of the inlet particle accelerator fan 115 (FIG. 4). With reference to FIG. 4, the first portion 214 is coupled to the inlet particle accelerator fan 115, which in turn is coupled to a suitable duct 224.

The second portion 216 of the gear case 210 receives a portion of the gear train assembly 204. The second portion 216 also receives the air oil separator 130. The second portion 216 is substantially cylindrical; however, the second portion 216 may have any desired shape. The second portion 216 is arranged between the first portion 214 and the third portion 218. The third portion 218 receives a portion of the gear train assembly 204. The third portion 218 is substantially cylindrical, and is coupled to the fuel metering unit 206 at a first end and the oil pump 125 at a second end.

Figure 7:
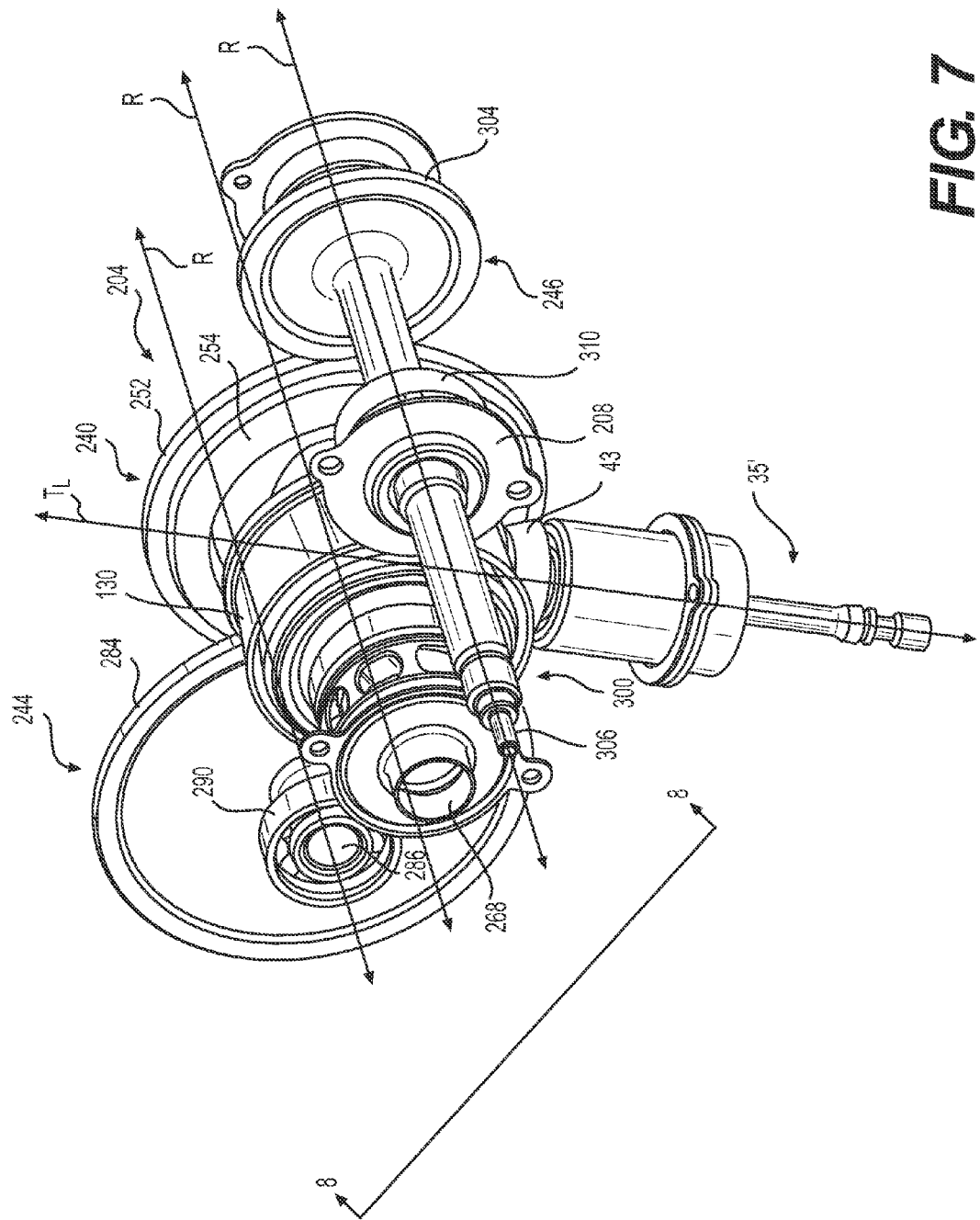
FIG. 7 is a perspective view of a gear train assembly of the transverse AGB of FIG. 4.
Figure 8:
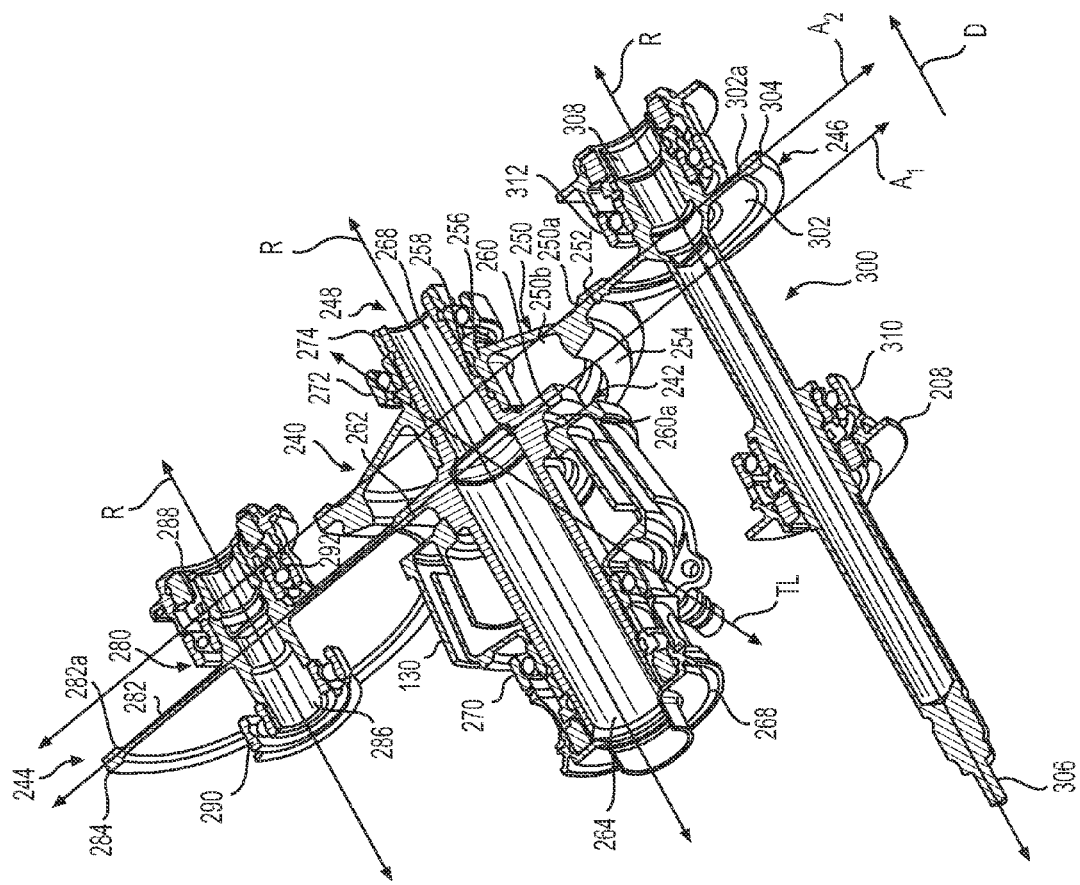
FIG. 8 is a cross-sectional view of the gear train assembly of FIG. 7, taken along line 8-8 of FIG. 7.

With reference to FIG. 7, the gear train assembly 204 is shown coupled to the tower shaft 35'. In FIG. 7, the gear train assembly 204 is illustrated without the housing 201 for simplicity and to aid in understanding. It should be understood that when assembled, the housing 201 encloses a portion of the gear train assembly 204 and is configured to enable a portion of the gear train assembly 204 to meshingly engage with the tower shaft 35' as illustrated in FIG. 4. The gear train assembly 204 includes a first gear 240, a second gear 242, a third gear 244 (FIG. 8) and a fourth gear 246. With reference to FIG. 8, each of the first gear 240, the second gear 242, the third gear 244 and the fourth gear 246 rotate about a respective rotational axis R, which is also generally a centerline for each of the first gear 240, the second gear 242, the third gear 244 and the fourth gear 246. Each rotational axis R is transverse to a longitudinal axis TL of the tower shaft 35'. In one example, each rotational axis R is substantially perpendicular to the longitudinal axis TL of the tower shaft 35'. Each rotational axis R is also substantially perpendicular to the longitudinal axis L of the gas turbine engine 100. Each rotational axis R is also substantially perpendicular is also substantially perpendicular to the drive shaft 30 and to the rotational axis of the drive shaft 30 of the gas turbine engine 100. Moreover, the rotational axes of all of the accessories (not shown) driven by the transverse AGB 200 are also perpendicular to the drive shaft 30 and to the rotational axis of the drive shaft 30. For clarity, the various teeth associated with each of the first gear 240, the second gear 242, the third gear 244 and the fourth gear 246 are not illustrated herein, with the understanding that the various engagement surfaces of the first gear 240, the second gear 242, the third gear 244 and the fourth gear 246 described herein below each include a plurality of gear teeth according to various embodiments.

As best illustrated in FIG. 8, the third gear 244 and the second gear 242 extend along a first axis A1 within the housing 201, and the first gear 240 and the fourth gear 246 extend along a second axis A2 within the housing 201. The first axis A1 and the second axis A2 are each substantially perpendicular to the rotational axes R and substantially parallel to the axis A of the housing 201. The first axis A1 and the second axis A2 are also spaced apart from or offset from each other.

With reference to FIG. 8, the first gear 240 and the second gear 242 are coupled to or mounted on a first shaft 248. The first gear 240 is generally formed of a metal or metal alloy through a suitable manufacturing technique, such as casting, machining, etc., and is coupled to the first shaft 248 through a suitable technique such as welding, press-fit, etc. The first gear 240 includes a hub 250, a first engagement surface 252 and a second engagement surface 254. The hub 250 includes a post 256, which defines an opening 258. The opening 258 receives a portion of the first shaft 248 to couple the first gear 240 to the first shaft 248. Generally, the opening 258 is sized such that the first gear 240 is pressed onto the first shaft 248 such that rotation of the first gear 240 causes the rotation of the first shaft 248. The post 256 is sized to be positioned adjacent to the second gear 242 when the first gear 240 is coupled to the first shaft 248.

The first engagement surface 252 is defined at a periphery of the hub 250 and extends substantially about a perimeter 250a or circumference of the hub 250. The first engagement surface 252 is coupled to and engages with the fourth gear 246 to drive the fourth gear 246. In one example, the first engagement surface 252 comprises a first plurality of teeth, which are spaced apart the perimeter 250a of the hub 250 to meshingly engage with and drive the fourth gear 246. In this example, the first engagement surface 252 comprises about 78 gear teeth, which have a diametral pitch of about 16. Generally, the first engagement surface 252 drives the fourth gear 246 in a counterclockwise direction when viewed along a direction D.

The second engagement surface 254 is defined adjacent to the periphery of the hub 250 and extends substantially about the perimeter 250a of the hub 250 along a first side 250b of the hub 250. Generally, the second engagement surface 254 extends only along the first side 250b of the hub 250, and is spaced apart from the first engagement surface 252. The second engagement surface 254 is coupled to and engages with the tower shaft 35' to enable the tower shaft 35' to drive the first gear 240. In one example, the second engagement surface 254 comprises a plurality of beveled teeth, which are spaced apart along the side 250b of the hub 250 to meshingly engage with the bevel gear 43 of the tower shaft 35' (FIG. 7). In this example, the second engagement surface 254 comprises about 88 beveled gear teeth, which have a diametral pitch of about 20. Generally, the second engagement surface 254 is driven by the bevel gear 43 of the tower shaft 35' in a clockwise direction when viewed along the direction D.

The second gear 242 is composed of a metal or metal alloy and is generally formed about the first shaft 248 through a suitable forming technique, such as casting, etc., however; it should be understood that the second gear 242 may be formed separately from the first shaft 248 and coupled to the first shaft 248 via a suitable technique, such as welding, press-fit, etc. The second gear 242 has a diameter that is smaller than or less than a diameter of the first gear 240. The second gear 242 includes a hub 260 and a third engagement surface 262. The hub 260 extends outwardly from the first shaft 248. The third engagement surface 262 is defined at a periphery of the hub 260 and extends substantially about a perimeter 260a or circumference of the hub 260. The third engagement surface 262 is coupled to and engages with the third gear 244 to drive the third gear 244. In one example, the third engagement surface 262 comprises a second plurality of teeth, which are spaced apart along the perimeter 260a of the hub 260 to meshingly engage with and drive the third gear 244. In this example, the third engagement surface 262 comprises about 52 gear teeth, which have a diametral pitch of about 20. Generally, the third engagement surface 262 drives the third gear 244 in a counterclockwise direction when viewed along the direction D.

The first shaft 248 is rotatable by the tower shaft 35' via the first gear 240 and the bevel gear 43 (FIG. 7). The first shaft 248 has a first end 264 and a second end 266. The first end 264 is coupled to the air oil separator 130 and is coupled to a breather vent 268. The air oil separator 130 is coupled to the first shaft 248 such that the rotation of the first shaft 248 drives the air oil separator 130. A bearing 270 is coupled to the first shaft 248 between the air oil separator 130 and the breather vent 268 to assist in the rotation of the first shaft 248. The bearing 270 may comprise any suitable bearing, including, but not limited to, a ball bearing.

The second end 266 includes a bearing 272 and a collar 274. The bearing 272 is coupled to the first shaft 248 to assist with the rotation of the first shaft 248. The bearing 272 is generally coupled to the first shaft 248 to be positioned between the first gear 240 and the collar 274. The bearing 272 may comprise any suitable bearing, including, but not limited to, a ball bearing. The collar 274 assists in retaining the bearing 272 on the first shaft 248.

The third gear 244 is generally formed of a metal or metal alloy through a suitable manufacturing technique, such as casting, machining, etc., and is coupled to a second shaft 280 through a suitable technique such as welding, press-fit, etc. In one example, the third gear 244 is formed about the second shaft 280, however; it should be understood that the third gear 244 may be formed separately from the second shaft 280 and coupled to the second shaft 280 via a suitable technique, such as welding, press-fit, etc. The third gear 244 has a diameter that is greater than the diameter of the first gear 240 and the diameter of the second gear 242. The third gear 244 includes a hub 282 and a fourth engagement surface 284.

The hub 282 extends outwardly from the second shaft 280. The fourth engagement surface 284 is defined at a periphery of the hub 282 and extends substantially about a perimeter 282a or circumference of the hub 250. The fourth engagement surface 284 is coupled to and engages with the third engagement surface 262 of the second gear 242 to be driven by the second gear 242. In one example, the fourth engagement surface 284 comprises a third plurality of teeth, which are spaced apart the perimeter 282a of the hub 282 to meshingly engage with the third engagement surface 262 of the third gear 244. In this example, the fourth engagement surface 284 comprises about 107 gear teeth, which have a diametral pitch of about 20. Generally, the fourth engagement surface 284 is driven by the second gear 242 in a counterclockwise direction when viewed along the direction D.

The second shaft 280 has a length, which is less than a length of the first shaft 248. The second shaft 280 includes a first end 286 and a second end 288. The third gear 244 is generally formed about the second shaft 280 between the first end 286 and the second end 288. The first end 286 is coupled to the oil pump 125, and includes a bearing 290 to assist in the rotation of the second shaft 280. The bearing 290 may comprise any suitable bearing, including, but not limited to, a ball bearing. The second end 288 is coupled to the fuel metering unit 206, and includes a bearing 292 to assist in the rotation of the second shaft 280. The bearing 292 may comprise any suitable bearing, including, but not limited to, a ball bearing.

The fourth gear 246 is coupled to or mounted on a third shaft 300. The fourth gear 246 is generally formed of a metal or metal alloy through a suitable manufacturing technique, such as casting, machining, etc., and is coupled to the third shaft 300 through a suitable technique such as welding, press-fit, etc. In one example, the fourth gear 246 is formed about the third shaft 300, however; it should be understood that the fourth gear 246 may be formed separately from the third shaft 300 and coupled to the third shaft 300 via a suitable technique, such as welding, press-fit, etc. The fourth gear 246 has a diameter that is less than the diameter of the first gear 240 and the diameter of the third gear 244, but is greater than the diameter of the second gear 242. The fourth gear 246 includes a hub 302 and a fifth engagement surface 304.

The hub 302 extends outwardly from the third shaft 300. The fifth engagement surface 304 is defined at a periphery of the hub 302 and extends substantially about a perimeter 302a or circumference of the hub 302. The fifth engagement surface 304 is coupled to and engages with the first engagement surface 252 of the first gear 240 to be driven by the first gear 240. In one example, the fifth engagement surface 304 comprises a fifth plurality of teeth, which are spaced apart the perimeter 302a of the hub 302 to meshingly engage with the first engagement surface 252 of the first gear 240. In this example, the fifth engagement surface 304 comprises about 46 teeth, which have a diametral pitch of about 16. Generally, the fifth engagement surface 304 is driven by the first gear 240 in a counterclockwise direction when viewed along the direction D.

The third shaft 300 has a length, which is greater than the length of the first shaft 248 and the length of the second shaft 280. The third shaft 300 includes a first end 306 and a second end 308. The fourth gear 246 is generally formed about the third shaft 300 near the second end 308. The first end 306 is coupled to the inlet particle accelerator fan 115 (FIG. 4). The permanent magnet alternator 208 is coupled to the third shaft 300 between the first end 306 and the second end 308.

Generally, the permanent magnet alternator 208 is coupled to the third shaft 300 to rotate with the third shaft 300. A bearing 310 is coupled adjacent to the permanent magnet alternator 208 to assist in the rotation of the third shaft 300. The bearing 310 may comprise any suitable bearing, including, but not limited to, a ball bearing. The second end 308 is coupled to the air turbine starter 135, and includes a bearing 312 to assist in the rotation of the third shaft 300. The bearing 312 may comprise any suitable bearing, including, but not limited to, a ball bearing.

Figure 5:
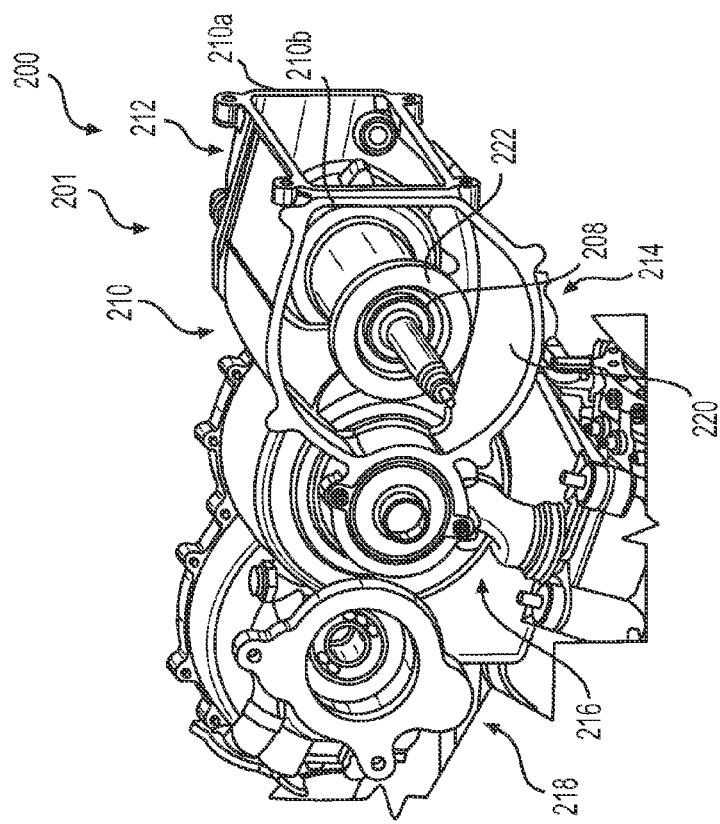
FIG. 5 is a perspective view of the transverse AGB of FIG. 4 from a first side of the transverse AGB.

In order to assemble the transverse AGB 200, in one example, the third shaft 300 is coupled to the gear case 210 with the fourth gear 246 formed thereon. The bearing 310 and the permanent magnet alternator 208 are coupled to the third shaft 300 near the first end 306, and the bearing 312 is coupled to the second end 308. The first shaft 248 is coupled to the gear case 210, and the first gear 240 is pressed onto the first shaft 248. The bearing 272 and the collar 274 are coupled to the second end 266 of the first shaft 248. The air oil separator 130 is coupled adjacent to the second gear 242, and the bearing 270 is coupled adjacent to the air oil separator 130. The breather vent 268 is coupled to the first end 264 of the first shaft 248. The second shaft 280 is coupled to the gear case 210, with the third gear 244 formed thereon. The bearing 290 is coupled to the first end 286, and the bearing 292 is coupled to the second end 288. With the gear train assembly 204 coupled to the gear case 210, the cover 212 is coupled to the gear case 210 via the mechanical fasteners 212b to surround the second end 308 of the third shaft 300, the second end 266 of the first shaft 248 and the second end 288 of the second shaft 280 (FIG. 5).

Figure 9:
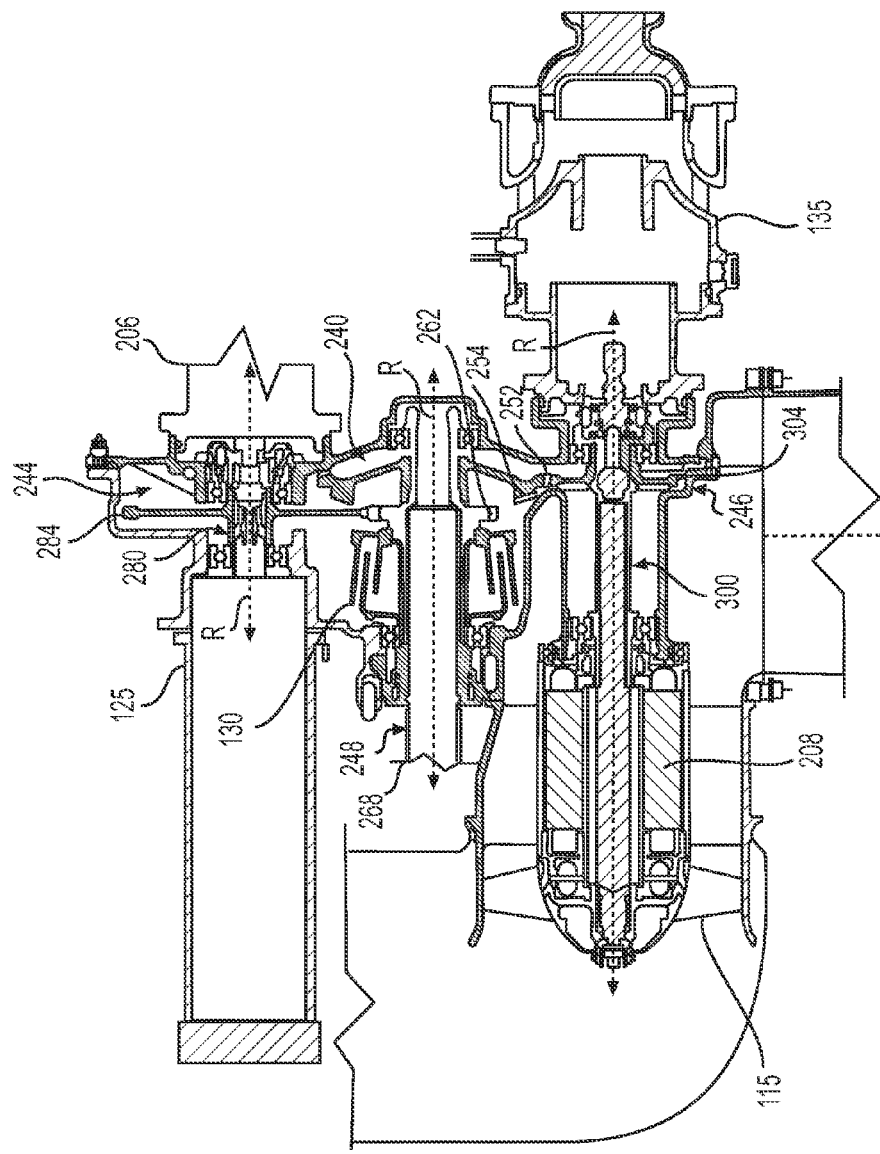
FIG. 9 is a cross-sectional schematic view of the gear train assembly of the transverse AGB of FIG. 4, taken along line 9-9 of FIG. 4, which illustrates the gear train assembly driving various accessories associated with the gas turbine engine.

When in use, the drive shaft 30 drives the tower shaft 35'. The bevel gear 43 of the tower shaft 35' meshingly engages the second engagement surface 254 of the first gear 240 to drive the first gear 240 (FIG. 7). With reference to FIG. 9, the rotation of the first gear 240 rotates the first shaft 248, which drives the air oil separator 130. As the first engagement surface 252 of the first gear 240 meshingly engages with the fifth engagement surface 304 of the fourth gear 246, the rotation of the first gear 240 rotates the fourth gear 246. The rotation of the fourth gear 246 drives the permanent magnet alternator 208, the inlet particle accelerator fan 115 and the air turbine starter 135.

Further, as the third engagement surface 262 of the second gear 242 meshingly engages with the fourth engagement surface 284 of the third gear 244, the rotation of the first shaft 248 rotates the third gear 244. The rotation of the third gear 244 rotates the second shaft 280. The rotation of the second shaft 280 drives the oil pump 125 and the fuel metering unit 206. Thus, the transverse AGB 200 drives various accessories of the gas turbine engine 100 with a compact gear train assembly 204 that is arranged in a housing 201, which extends along an axis substantially parallel to the rotational axis of the drive shaft 30 of the gas turbine engine 100.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An accessory gear box for a gas turbine engine having a drive shaft with a rotational axis and a tower shaft coupled to the drive shaft, the accessory gear box comprising:
   a first plurality of gears arranged within the accessory gear box, the first plurality of gears extending along a first axis substantially parallel to the rotational axis of the drive shaft;
   a second plurality of gears arranged within the accessory gear box, the second plurality of gears extending along a second axis, the second axis offset from and substantially parallel to the first axis; and
   a first shaft, with one of the first plurality of gears coupled to the first shaft, and a first one of the second plurality of gears coupled to a second shaft,
   wherein a second one of the second plurality of gears is coupled to the first shaft and includes a first engagement surface and a second engagement surface, the first engagement surface to engage the tower shaft and the second engagement surface is coupled to the first one of the second plurality of gears to drive the second shaft.

2. The accessory gear box of claim 1, wherein the one of the first plurality of gears coupled to the first shaft is coupled to another one of the first plurality of gears to drive a third shaft.

3. The accessory gear box of claim 1, wherein each of the first plurality of gears include a rotational axis, and the rotational axis of each of the first plurality of gears is transverse to a longitudinal axis of the tower shaft.

4. The accessory gear box of claim 1, further comprising a housing that extends along a longitudinal axis, and the longitudinal axis of the housing is substantially parallel to the rotational axis of the drive shaft.

5. The accessory gear box of claim 1, wherein the first engagement surface is defined along a surface of the second one of the second plurality of gears near a periphery of the second one of the second plurality of gears.

6. The accessory gear box of claim 5, wherein the second engagement surface is defined at the periphery of the second one of the second plurality of gears.

7. The accessory gear box of claim 1, wherein the first plurality of gears are arranged in a first row, and the second plurality of gears are arranged in a second row, the first row and the second row comprising the only gears arranged within the accessory gear box.

8. A gas turbine engine, comprising:
   a drive shaft having a rotational axis;
   a tower shaft having a first end coupled to the drive shaft, and a second end including a bevel gear, the tower shaft having a longitudinal axis transverse to the rotational axis of the drive shaft;
   an accessory gear box comprising:
      a first plurality of gears arranged within the accessory gear box, the first plurality of gears extending along a first axis substantially parallel to the rotational axis of the drive shaft and transverse to the longitudinal axis of the tower shaft;
      a second plurality of gears arranged within the accessory gear box, the second plurality of gears extending along a second axis, the second axis offset from and substantially parallel to the first axis and the rotational axis of the drive shaft; and
      a first shaft, with one of the first plurality of gears coupled to the first shaft, and a first one of the second plurality of gears coupled to a second shaft, wherein a second one of the second plurality of gears is coupled to the first shaft and includes a first engagement surface and a second engagement surface, and the first engagement surface is coupled to the bevel gear of the tower shaft.

9. The gas turbine engine of claim 8, wherein the second engagement surface is coupled to a third engagement surface of the first one of the second plurality of gears to drive the second shaft.

10. The gas turbine engine of claim 8, wherein the one of the first plurality of gears includes a fourth engagement surface, which is coupled to a fifth engagement surface of another one of the first plurality of gears to drive a third shaft.

11. The gas turbine engine of claim 8, wherein the first plurality of gears are arranged in a first row, and the second plurality of gears are arranged in a second row, the first row and the second row comprising the only gears arranged within the accessory gear box.

12. The gas turbine engine of claim 8, wherein the first engagement surface is defined along a surface of the second one of the second plurality of gears near a periphery of the second one of the second plurality of gears and the second engagement surface is defined at the periphery to extend about a perimeter of the second one of the second plurality of gears.

13. The gas turbine engine of claim 9, wherein the second shaft drives an inlet particle accelerator fan, a permanent magnet alternator and an air turbine starter.

14. The gas turbine engine of claim 8, wherein the first shaft drives an air oil separator.

15. The gas turbine engine of claim 10, wherein the third shaft drives an oil pump and a fuel metering unit.

16. A gas turbine engine, comprising:
a drive shaft having a rotational axis;
a tower shaft having a first end coupled to the drive shaft, and a second end including a bevel gear, the tower shaft having a longitudinal axis transverse to the rotational axis of the drive shaft;
an accessory gear box comprising:
a first plurality of gears arranged within the accessory gear box, the first plurality of gears each having a rotational axis, the rotational axis of each of the first plurality of gears substantially perpendicular to the rotational axis of the drive shaft and the longitudinal axis of the tower shaft;
a second plurality of gears arranged within the accessory gear box, the second plurality of gears each having a rotational axis, the rotational axis of each of the second plurality of gears substantially perpendicular to the rotational axis of the drive shaft and the longitudinal axis of the tower shaft, and the rotational axis of each of the second plurality of gears substantially parallel to the rotational axis of each of the first plurality of gears; and
a first shaft, with one of the first plurality of gears coupled to the first shaft, and a first one of the second plurality of gears coupled to a second shaft,
wherein a second one of the second plurality of gears is coupled to the first shaft and includes a first engagement surface and a second engagement surface, the first engagement surface is coupled to the bevel gear of the tower shaft and the second engagement surface is coupled to the first one of the second plurality of gears to drive the second shaft.

17. The gas turbine engine of claim 16, wherein the one of the first plurality of gears includes a fourth engagement surface, which is coupled to a fifth engagement surface of another one of the first plurality of gears to drive a third shaft.

18. The gas turbine engine of claim 16, wherein the first plurality of gears are arranged in a first row, and the second plurality of gears are arranged in a second row, the first row and the second row comprising the only gears arranged within the accessory gear box.

19. The gas turbine engine of claim 16, wherein the second shaft drives an inlet particle accelerator fan, a permanent magnet alternator and an air turbine starter, and the first shaft drives an air oil separator.

20. The gas turbine engine of claim 17, wherein the third shaft drives an oil pump and a fuel metering unit.

\* \* \* \* \*